United States Patent [19]
Pedlow, Jr.

[11] Patent Number: 6,122,380
[45] Date of Patent: Sep. 19, 2000

[54] APPARATUS AND METHOD OF PROVIDING STEREO TELEVISION AUDIO SIGNALS

[75] Inventor: Leo Mark Pedlow, Jr., Ramona, Calif.

[73] Assignees: Sony Corporation, Tokyo, Japan; Sony Electronics, Park Ridge, N.J.

[21] Appl. No.: 08/982,274

[22] Filed: Dec. 1, 1997

[51] Int. Cl.[7] .............................. H04H 5/00; H04N 7/084
[52] U.S. Cl. ................. 381/2; 348/483; 348/485
[58] Field of Search ......................... 381/2, 10; 348/738, 348/485, 483; 386/39

[56] References Cited

U.S. PATENT DOCUMENTS

| | | | |
|---|---|---|---|
| 5,610,985 | 3/1997 | Ten Kate | 381/27 |
| 5,638,451 | 6/1997 | Sedlmeyer | 381/2 |
| 6,037,993 | 3/2000 | Easley | 348/485 |

*Primary Examiner*—Forester W. Isen
*Assistant Examiner*—Brian Tyrone Pendleton
*Attorney, Agent, or Firm*—Blakely, Sokoloff, Taylor & Zafman LLP

[57] ABSTRACT

The present invention is a method and apparatus for providing stereo audio signals is disclosed. The circuit for providing stereo audio signals comprises an interface circuit coupled to receive an audio signal. The interface circuit has an analog-to-digital converter for digitizing the audio signal to provide a first audio input signal and a second audio input signal. A first processing circuit coupled to the interface circuit is configured to generate a first audio output signal based on the first audio input signal. A second processing circuit coupled to the interface circuit is configured to generate a second audio output signal based on the second audio input signal. The circuit further comprises a processor coupled to the interface circuit and a memory for storing instruction sequences. The processor executes the stored instruction sequences, wherein the stored instruction sequences include process steps to cause the processor to generate a third audio input signal based on the first and the second audio input signals. A third processing circuit coupled to the processor is configured to generate a third audio output signal based on the third audio input signal.

31 Claims, 2 Drawing Sheets

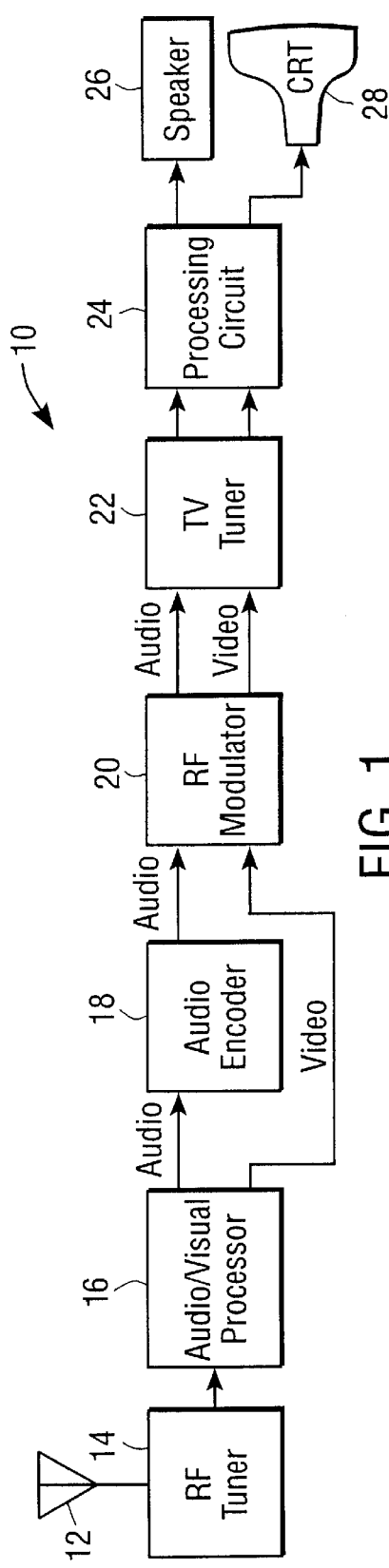
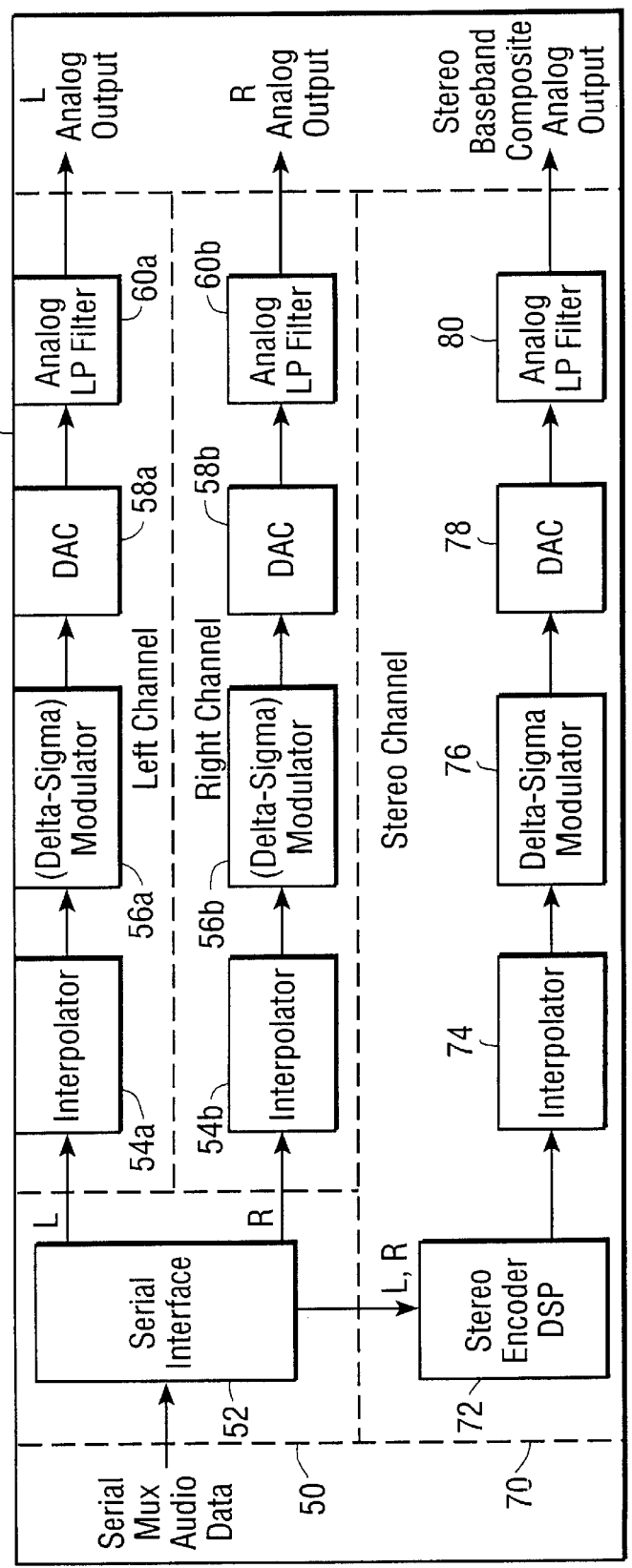

APPARATUS AND METHOD OF PROVIDING STEREO TELEVISION AUDIO SIGNALS

BACKGROUND OF THE INVENTION

1. Field of the Invention

The present invention relates to a method and apparatus for providing stereo television audio signals for recording on a recording medium or for transmission over a transmission channel in a stereophonic system or a multi-sound system.

2. Description of the Related Art

The communications technology for providing television signals is based on established infrastructure standards. These are very specific formats for transmitting signals to television receivers via radio frequency transmissions and via cable. In the United States, television signals must conform to the National Television Standards Committee (NTSC) standard. The NTSC calls for 525 lines of resolution transmitted at 60 half frames per second. The composite signal transmitted from a broadcast television facility includes the radio frequency (RF) carrier plus video signals containing color and luminosity information, audio signals containing sound information, and a Multichannel Television Sound (MTS) signal for deriving stereophonic audio separation. The composite signal minus the carrier is used for direct connection (i.e. wired connection) of video and audio signals.

Currently, there are only two ways of connecting a home entertainment video device such as a satellite receiver, a video cassette recorder (VCR), a laser disk player, etc. to a television receiver. The first method is a direct connection by shielded cable, of the baseband video, and of the left and right audio terminals between the two devices, using discrete cables for each signal. The second method, which is used extensively in the United States, is the use of signals from a RF modulator unit inside the source unit which combines video and audio information. The signals from the RF modulator provides the output signal on a single coaxial cable and emulates a standard broadcast channel to the television receiver. Although the use of the RF modulator signal eliminates the need for two additional discrete cables, it does not provide a high quality stereo audio output.

One approach to this problem is the implementation of a discrete analog stereo audio encoder that is installed external to the television receiver. Such a stereo audio encoder is complex and expensive, and thus precludes its use on low cost home entertainment products.

Accordingly, there is a need in the technology for a method and apparatus for generating stereo audio signals, including an MTS stereo composite signal, for transmission to a television receiver or a VCR, that is simple and can be easily implemented into low cost home entertainment products.

BRIEF SUMMARY OF THE INVENTION

The present invention is a method and apparatus for providing stereo audio signals is disclosed. The circuit for providing stereo audio signals comprises an interface circuit coupled to receive an audio signal. The interface circuit has an analog-to-digital converter for digitizing the audio signal to provide a first audio input signal and a second audio input signal. A first processing circuit coupled to the interface circuit is configured to generate a first audio output signal based on the first audio input signal. A second processing circuit coupled to the interface circuit is configured to generate a second audio output signal based on the second audio input signal. The circuit further comprises a processor coupled to the interface circuit and a memory for storing instruction sequences. The processor executes the stored instruction sequences, wherein the stored instruction sequences include process steps to cause the processor to generate a third audio input signal based on the first and the second audio input signals. A third processing circuit coupled to the processor is configured to generate a third audio output signal based on the third audio input signal.

BRIEF DESCRIPTION OF THE DRAWINGS

FIG. 1 is a system block diagram of a communication system which implements the present invention.

FIG. 2 is a block diagram of the one embodiment of the stereo audio encoder of FIG. 1.

DETAILED DESCRIPTION OF THE INVENTION

Figure 3:
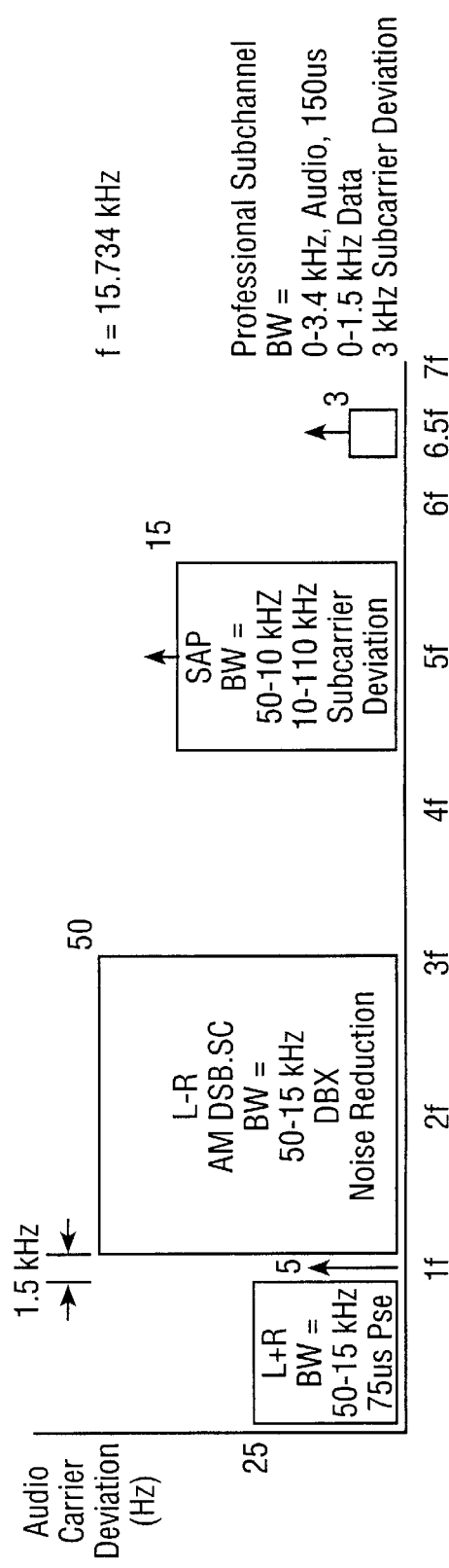
FIG. 3 is a graph illustrating the spectral relationship of the components (L+R) and (L−R) that comprise a composite BTSC baseband audio signal (as generated by the serial interface 52 of FIG. 2) that is applied to the RF modulator 20 of FIG. 1.

FIG. 1 is a system block diagram of a television audio and video system 10 which incorporates the use of the present invention. The system 10 receives the television signals via an antenna 12, that are provided to a tuner 14, such as a satellite tuner or an RF tuner, which selects the desired signals available at the antenna and excludes all other signals. The tuner 14 then amplifies the selected signals to a level so that demodulation of the information on the carrier signal can occur. The selected and amplified signals are then provided to an RF audio/visual processor 16, which includes circuitry for processing the signals and for separating the RF signals into audio and visual components. The audio components are then provided to a digital stereo audio encoder 18, while the video components are provided to an RF modulator 20. In one embodiment, the stereo audio encoder 18 is a multichannel television stereo (MTS) audio encoder. The audio encoder 18 digitizes the audio components and then provides stereo encoding for the audio components, as will be discussed in detail in the following sections. In one embodiment, the stereo encoder provides MTS stereo encoding for the audio components. The resulting audio components are then provided to the RF modulator 20.

The RF modulator 20 in turn modulates the audio components from a carrier frequency that is above that of the picture carrier frequency, in accordance with the Federal Communications Commission (FCC) standards. The resulting audio and video signals are then provided to a television tuner 22, which selects the desired signals available at the modulator 20 and excludes all other signals. The television tuner 22 also amplifies the selected signals to a level so that demodulation of the information on the carrier signal can occur. The selected signals are then provided to a processing circuit 24, which processes the signals and separates the signals into audio and visual components. The audio and visual components are then respectively provided a speaker 26 and a picture tube 28, such as a cathode ray tube.

FIG. 2 is a block diagram of the Audio Encoder 18 of FIG. 1. The Audio Encoder 18 comprises a left and right (L & R) channel audio processor 50 and a stereo processor 70. The L & R channel audio processor 50 includes a serial interface 52, which first digitizes the audio signals from the Audio/Visual Processor 16 and then provides the digitized signals as a pair of left (L) and right (R) channel signals respectively to a left and right audio processing channels, namely, the Left and the Right Channels. Processing of the digitized signals in each channel is identical, and for present purposes, only the circuitry in the Left Channel will be discussed. The digitized audio signals from the serial interface are first interpolated by Interpolator 54a to provide additional quantized samples. The resulting signals are then provided to a modulator 56a which modulates or encodes the audio signals into a format suitable for transmission. In one embodiment, the modulator 56a is a Delta-Sigma modulator, which quantizes the delta (difference) between the current signal and the sigma (sum) of the previous difference. The modulated audio signals are then converted back to analog signals by the digital-to-analog converter 58a, and then filtered by filter 60a. In one embodiment, the filter 60a is an analog low pass filter. The resulting filtered audio signals are then provided as Left Channel analog audio outputs.

FIG. 3 is a graph illustrating the spectral relationship of the components (L+R and L−R) that comprise a composite Broadcast Television Standards Committee (BTSC) baseband composite audio signal, that is applied to the modulator 20 (see FIG. 1). The signals of interest are the (L+R) and (L−R) stereo matrix components, which limit the total bandwidth to less than 48 KHz, instead of the 75 KHz allowed by the BTSC signal. The present invention utilizes a digital signal processor (DSP) to encode the (L+R) signals to provide a stereo composite signal.

Figure 4:
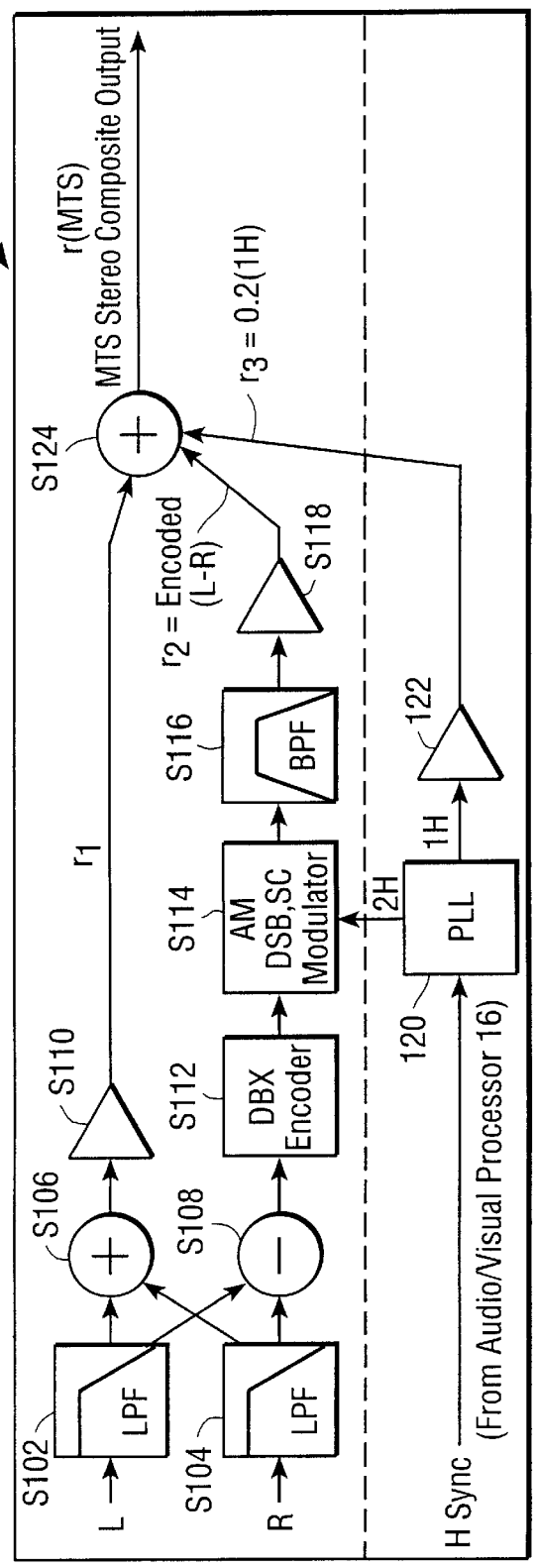
FIG. 4 is a functional block diagram of the stereo audio encoder of FIG. 2.

The audio processor 70 receives digitized left and right (L+R) channel audio signals from the serial interface 52 and encodes the digitized audio signals to provide a stereo composite signal, such as an MTS stereo composite signal, that can be readily applied to a modulator such as RF modulator 20 (see FIG. 1). The encoding is performed by a digital signal processor (DSP) 72 performing the signal processing functions represented by the block diagram process as shown in FIG. 4 and as described below.

In one embodiment, the stereo composite signal is an MTS stereo composite signal which conforms to the Broadcast Television Standards Committee (BTSC) specification. The BTSC provides a standard for transmitting stereo audio signals compatible with the existing monaural audio. The MTS stereo composite signal also conforms to the FCC's MTS format for broadcasting stereo audio signals.

In particular, the DSP 72 is configured to perform encoding functions which can be expressed as follows:

For two signals, L and R, which are provided via two channels, namely, the L & R channels,

SUM=L+R

DIFF=compress (L−R)

[DSB, SC]=2*compress(L−R)*2H r(MTS)=SUM+[0.2* (1H)]+[DSB, SC]

where 1H and 2H respectively represent the fundamental horizontal frequency and the first harmonic frequencies of a synchronization signal. In one embodiment, the synchronization signal is a video horizontal synchronization signal (H-sync). In one embodiment, 1H=15.734 KHz and 2H=31.468 KHz;

the function "compress" is the DBX™ encoding process as required by the BTSC specification. The DBX™ encoding process performs frequency dependent compression of the (L−R) matrix signal.

FIG. 4 is a functional block diagram of the encoding process S100 of the present invention. As shown, the DSP 72 implements functions (S102 and S104 respectively) to first low-pass filter the digitized left and right (L and R) audio signals. The sum and difference of the left and right channels are then obtained, as shown in functions steps S106 and S108. The sum of the L and R signals (i.e., SUM) is then amplified, as shown by functional block S110, to provide an output signal r1. The difference of L and R (i.e., DIFF) is encoded using the DBX™ encoding process, as described above, to obtain an encoded signal. The encoded signal is modulated to provide a double side band, suppressed carrier [DSB, SC] signal, i.e., the encoded signal (i.e., compress (L−R) is multiplied with 2*(2H), as shown by functional block S114. The resulting carrier signal is then band-pass filtered (functional block S116) and then amplified (functional blcok S118) to provide an output signal r2. An H-sync signal provided from the Audio/Visual Processor 16 (FIG. 1) is provided to a phase-locked loop 120, which provided the first fundamental frequency, 2H for the modulating process S114, and which also provides a fundamental horizontal frequency, 1H for the encoding process S100. The fundamental horizontal frequency signal is then amplified via amplifier 122 (functional block 122) to provide a resulting signal r3. Next, the signals r1, r2 and r3 are summed, as shown in functional block S124, to provide r(MTS), the MTS stereo composite signal.

Since the typical digital audio sampling frequency is 48 KHz for each channel, the DSP 72 will have to operate at a higher rate to process the MTS signal to provide the composite bandwidth of 48 KHz. This may be supported by most digital-to-analog converters which currently operate at 1.5, 2.3, 12.2 or 18.4 MHz, depending on word size and over sample mode. The high clock frequency provides sufficient bandwidth to ensure that the composite sample rate exceeds the Nyquist rate of 96 KHz.

The present invention thus provides a method and apparatus for generating stereo audio signals, including a stereo composite signal (such as a stereo MTS composite signal), for transmission to a television receiver or a VCR, that is simple and which can be easily implemented into low cost home entertainment products. The present invention provides a simple, cost effective solution for providing such stereo signals, and may replace functions performed in discrete analog electronics and filters, which require high precision and hand alignment. As a result, the cost of an audio encoder (such as an MTS audio encoder), which currently ranges in the hundreds of dollars, may be replaced by the present invention, which can cost merely a few dollars.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A circuit for providing stereo audio signals, comprising:
an interface circuit coupled to receive an audio signal, said interface circuit providing a first audio input signal and a second audio input signal based on said audio signal;

a processor coupled to said interface circuit, said processor executing instruction sequences to cause the processor to
   a) obtain a sum of said first audio input signal and said second audio input signal to provide a first value,
   b) obtain a difference of between said first audio input signal and said second audio input signal, and encoding said difference to provide an encoded difference value,
   c) multiply twice the encoded difference value with twice the first harmonic frequency of a synchronization signal to provide a second value,
   d) multiply a fundamental frequency of the synchronization signal with a predetermined number to provide a third value, and
   e) obtain a sum of said first, said second and said third values;
whereby the instruction sequences cause the processor to generate a third audio input signal based on said first and said second audio input signals; and
   a first processing circuit coupled to said processor, said first processing circuit configured to generate a first audio output signal based on said third audio input signal.

2. The circuit of claim 1, wherein the predetermined number is 0.2.

3. The circuit of claim 1, wherein the synchronization signal is a video horizontal synchronization signal.

4. The circuit of claim 1, wherein the instruction sequences further cause the processor to filter said first and said second audio input signals prior to obtaining the sum.

5. The circuit of claim 1, wherein encoding includes DBX encoding.

6. The circuit of claim 1, wherein the interface circuit includes an analog-to-digital converter for digitizing said first and said second audio input signals.

7. The circuit of claim 1 further comprising:
   a second processing circuit coupled to said interface circuit, said second processing circuit configured to generate a second audio output signal based on said first audio input signal; and
   a third processing circuit coupled to said interface circuit, said third processing circuit configured to generate a third audio output signal based on said second audio input signal.

8. The circuit of claim 7, wherein said second processing circuit further comprises:
   an analog-to-digital converter coupled to said interface circuit for digitizing said first audio input signal;
   a modulator coupled to said analog-to-digital converter for modulating the digitized first audio input signal;
   a digital-to-analog converter coupled to said modulator for converting the digitized first audio input signal to an analog first audio input signal; and
   a filter coupled to said digital-to-analog converter for filtering said analog first audio input signal to provide said first audio output signal.

9. The circuit of claim 7, wherein said third processing circuit further comprises:
   an analog-to-digital converter coupled to said interface circuit for digitizing said second audio input signal;
   a modulator coupled to said analog-to-digital converter for modulating the digitized second audio input signal;
   a digital-to-analog converter coupled to said modulator for converting the digitized second audio input signal to an analog second audio input signal; and
   a filter coupled to said digital-to-analog converter for filtering said second analog audio input signal to provide said second audio output signal.

10. The circuit of claim 1, wherein said first processing circuit further comprises:
   a modulator coupled to said processor for modulating the digitized third audio input signal;
   a digital-to-analog converter coupled to said modulator for converting the digitized third audio input signal to an analog third audio input signal; and
   a filter coupled to said digital-to-analog converter for filtering said analog third audio input signal to provide said first audio output signal.

11. A method for providing stereo audio signals, comprising:
   providing an interface circuit coupled to receive an audio signal, said interface circuit having an analog-to-digital converter for digitizing said audio signal to provide a first audio input signal and a second audio input signal;
   providing a processor coupled to said interface circuit, said processor executing instruction sequences to cause the processor to
     a) obtain a sum of said first audio input signal and said second audio input signal to provide a first value,
     b) obtain a difference of between said first audio input signal and said second audio input signal, and encoding said difference to provide an encoded difference value,
     c) multiply twice the encoded difference value with twice the first harmonic frequency of a synchronization signal to provide a second value,
     d) multiply a fundamental frequency of the synchronization signal with a predetermined number to provide a third value, and
     e) obtain a sum of said first, said second and said third values;
   whereby the instruction sequences cause the processor to generate a third audio input signal based on said first and said second audio input signals; and
   generating a first audio output signal based on said third audio input signal.

12. The method of claim 11, wherein the predetermined number is 0.2.

13. The method of claim 11, wherein the synchronization signal is a video horizontal synchronization signal.

14. The method of claim 11, wherein the stored instruction sequences further cause the processor to filter said first and said second audio input signals prior to obtaining the sum.

15. The method of claim 11, wherein encoding includes DBX encoding.

16. The method of claim 11, wherein the interface circuit includes an analog-to-digital converter for digitizing said first and said second audio input signals.

17. The method of claim 11, further comprising:
   modulating the digitized first audio input signal;
   converting the digitized first audio input signal to an analog first audio input signal; and
   filtering said analog first audio input signal to provide a second audio output signal.

18. The method of claim 11, further comprising:
   modulating the digitized second audio input signal;
   converting the digitized second audio input signal to an analog second audio input signal; and
   filtering said second analog audio input signal to provide a third audio output signal.

19. The method of claim 11, wherein generating a first audio output signal further comprises:
   modulating the digitized third audio input signal;
   converting the digitized third audio input signal to an analog third audio input signal; and
   filtering said analog third audio input signal to provide said first audio output signal.

20. A circuit for providing stereo audio signals, comprising:
   an interface circuit coupled to receive an audio signal, said interface circuit providing a first audio input signal and a second audio input signal based on said received audio signal;
   a first processing circuit coupled to said interface circuit, that is configured to generate a first and a second audio output signals based on said first and said second audio input signals;
   a processor coupled to said interface circuit, said processor executing instruction sequences, wherein the instruction sequences cause the processor to:
      a) obtain a sum of said first audio input signal and said second audio input signal to provide a first value;
      b) obtain a difference of between said first audio input signal and said second audio input signal, and encoding said difference to provide an encoded difference value;
      c) multiply twice the encoded difference value with twice the first harmonic frequency of a synchronization signal to provide a second value;
      d) multiply a fundamental frequency of the synchronization signal with a predetermined number to provide a third value; and
      e) obtain a sum of said first, said second and said third values;
   whereby the instruction sequences cause the processor to generate a third audio input signal based on said first and said second audio input signals; and
   a second processing circuit coupled to said processor, that is configured to generate a third audio output signal based on said third audio input signal.

21. The circuit of claim 20, wherein the predetermined number is 0.2.

22. The circuit of claim 20, wherein the synchronization signal is a video horizontal synchronization signal.

23. The circuit of claim 20, wherein the instruction sequences further cause the processor to filter said first and said second audio input signals prior to obtaining the sum.

24. The circuit of claim 20, wherein encoding includes DBX encoding.

25. The circuit of claim 20, wherein the interface circuit includes an analog-to-digital converter for digitizing said first and said second audio input signals.

26. The circuit of claim 25, wherein said first processing circuit further comprises:
   a modulator coupled to said interface circuit for modulating the digitized first audio input signal;
   a digital-to-analog converter coupled to said modulator for converting the digitized first audio input signal to an analog first audio input signal; and
   a filter coupled to said digital-to-analog converter for filtering said analog first audio input signal to provide said first audio output signal.

27. The circuit of claim 26, wherein said first processing circuit further comprises:
   a second modulator coupled to said interface circuit for modulating the digitized second audio input signal;
   a second digital-to-analog converter coupled to said modulator for converting the digitized second audio input signal to an analog second audio input signal; and
   second filter coupled to said digital-to-analog converter for filtering said second analog audio input signal to provide said second audio output signal.

28. The circuit of claim 25, wherein said second processing circuit comprises:
   a modulator coupled to said interface circuit for modulating the digitized third audio input signal;
   a digital-to-analog converter coupled to said modulator for converting the digitized third audio input signal to an analog third audio input signal; and
   a filter coupled to said digital-to-analog converter for filtering said analog third audio input signal to provide said third audio output signal.

29. A circuit for providing composite stereo audio signals based on a first and a second audio input signals, comprising:
   a processor, said processor executing stored instruction sequences, to cause the processor to
      a) obtain a sum of said first audio input signal and said second audio input signal to provide a first value,
      b) obtain a difference of between said first audio input signal and said second audio input signal, and encoding said difference to provide an encoded difference value,
      c) multiply twice the encoded difference value with twice the first harmonic frequency of a synchronization signal to provide a second value,
      d) multiply a fundamental frequency of the synchronization signal with a predetermined number to provide a third value, and
      e) obtain a sum of said first, said second and said third values;
   wherein the stored instruction sequences include process steps to cause the processor to generate a third audio input signal based on the first and the second audio input signals; and
   a processing circuit coupled to said processor, that is configured to generate a composite audio output signal based on said third audio input signal.

30. The circuit of claim 29, wherein the synchronization signal is a video horizontal synchronization signal.

31. The circuit of claim 29, wherein encoding includes DBX encoding.

* * * * *